(12) United States Patent
Linde et al.

(10) Patent No.: US 12,504,501 B2
(45) Date of Patent: Dec. 23, 2025

(54) WINDOW FOR AN AIRCRAFT, AIRCRAFT, AND METHOD FOR DETERMINING THE POSITION AT WHICH A LASER BEAM IMPACTS A WINDOW

(71) Applicant: Airbus Operations GmbH, Hamburg (DE)

(72) Inventors: Peter Linde, Hamburg (DE); Michael Telkamp, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 191 days.

(21) Appl. No.: 18/387,219

(22) Filed: Nov. 6, 2023

(65) Prior Publication Data

US 2024/0151810 A1    May 9, 2024

(30) Foreign Application Priority Data

Nov. 8, 2022    (EP) .................................... 22206123

(51) Int. Cl.
*B64C 1/14*    (2006.01)
*B64D 45/00*    (2006.01)
*G01S 5/16*    (2006.01)

(52) U.S. Cl.
CPC .................. *G01S 5/16* (2013.01); *B64C 1/14* (2013.01); *B64D 45/00* (2013.01)

(58) Field of Classification Search
CPC ... B60J 3/04; B64D 45/00; G01S 5/16; B64C 1/14; B64C 1/1476; B64C 1/1484
See application file for complete search history.

(56) References Cited

U.S. PATENT DOCUMENTS

| | | | |
|---|---|---|---|
| 9,415,745 B1 | 8/2016 | Clemen, Jr. | |
| 2019/0047382 A1* | 2/2019 | Glatfelter | B60J 3/04 |
| 2019/0276132 A1 | 9/2019 | Beard | |
| 2021/0114439 A1* | 4/2021 | Moschek | B60J 3/04 |

FOREIGN PATENT DOCUMENTS

| | | | | |
|---|---|---|---|---|
| CN | 108386115 A | 8/2018 | | |
| CN | 110171275 A | 8/2019 | | |
| DE | 102005015960 A1 | 10/2006 | | |
| KR | 20210026372 A * | 3/2021 | | B60R 16/03 |
| RU | 2492120 C2 | 9/2013 | | |

OTHER PUBLICATIONS

Translation of CN 110171275, Aug. 27, 2019.*
European Search Report for U.S. Appl. No. 22/206,123 dated Mar. 31, 2023.
European Intention to Grant in EP Application No. 22206123.6 dated Jun. 16, 2025, 27 pages.

* cited by examiner

*Primary Examiner* — Peter B Kim
(74) *Attorney, Agent, or Firm* — KDW Firm PLLC

(57) ABSTRACT

A window for an aircraft, the window including a first transparent layer, and a first plurality of light detectors arranged around a circumference of the first transparent layer to measure the intensity of light refracted upon entering and exiting the first transparent layer. An aircraft and a method for determining the point at which a laser beam impacts a window of the aircraft are disclosed.

20 Claims, 5 Drawing Sheets

WINDOW FOR AN AIRCRAFT, AIRCRAFT, AND METHOD FOR DETERMINING THE POSITION AT WHICH A LASER BEAM IMPACTS A WINDOW

TECHNICAL FIELD

The disclosure herein is directed to a window for an aircraft, aircraft, and method for determining the position at which a laser beam impacts a window.

BACKGROUND

High energy laser beams have increasingly been used to disturb transportation vehicles. 9723 laser incidents have been reported in 2021, which is up from 6,853 incidents in 2020.

This increasing number of laser beam incidents is an urgent problem, that airlines, airport authorities and law enforcement alike seek solutions to. The practical difficulty lies in the fact, that once board crew has reported an incident, only a rough idea may be available of the location of the source. In darkness this is almost impossible. Since no reasonable information about the location of the source is available, the attackers can rarely be apprehended.

SUMMARY

In view of the above, it is an object of the disclosure herein to provide a possibility to determine the point of origin of a laser beam impacting a window of an aircraft in a timely manner.

This problem is solved by a window for an aircraft, an aircraft with features disclosed herein, and a method for determining the position at which a laser beam impacts a window as disclosed herein.

To that effect, a first aspect of the disclosure herein provides a window for an aircraft. The window comprises a first transparent layer, and a first plurality of light detectors arranged around a circumference of the first transparent layer and configured to measure the intensity of light refracted upon entering and exiting the first transparent layer.

A further aspect of the disclosure herein provides an aircraft comprising a window according to the disclosure herein, wherein the window in particular is configured to be a windshield of a cockpit.

A further aspect of the disclosure herein provides a method for determining the point of origin of a laser beam directed at an aircraft according to the disclosure herein. An intensity of light refracted upon entering and exiting the first transparent layer is measured by the first plurality of light detectors. A position at which the laser beam entered the first transparent layer is determined using the intensity of refracted light measured by each of the first plurality of light detectors.

One idea of the disclosure herein lies in using refracted light to determine the position at which a laser beam impacts the window. As light is refracted in all directions upon traveling between mediums with differing refraction indices, some of the light will travel at angles which impact the circumference of the window. Light detectors arranged around this circumference can measure the intensity of light refracted in these respective directions and these intensities can then be used to determine the position of impact. This position of impact can then be used for a variety of countermeasures as described in the further embodiments of the disclosure herein.

Advantageous embodiments and further developments are apparent from the description with reference to the figures.

According to a further embodiment of the method, the position of impact can be used to determine the point of origin of the laser beam, as will be explained in further detail with reference of the drawings. Determining the point of origin of the laser beam advantageously allows for increased chance of apprehending the person responsible for the emission of the laser beam.

According to one further embodiment, the window further comprises a second transparent layer, and a second plurality of light detectors arranged around a circumference of the second transparent layer and configured to measure the intensity of light refracted upon entering and exiting the second transparent layer.

According to a further embodiment of the method, an intensity of light refracted upon entering and exiting the second transparent layer is measured by the second plurality of light detectors, a position at which the laser beam entered the second transparent layer is determined using the intensity of refracted light measured by each of the second plurality of light detectors, and an angle at which the laser beam impacted the window is determined utilizing the position at which the laser beam entered the first transparent layer and the position at which the laser beam entered the second transparent layer. The angle at which the laser beam impacted the window is used to determine the point of origin of the laser beam.

Using two positions the laser beam travels through enables determination of the point of origin with satisfactory accuracy.

According to a further embodiment of the window, at least one of the first plurality of light detectors and second plurality of light detectors are arranged to cover the entirety of the circumference of the first transparent layer or the second transparent layer in regular intervals. This improves the accuracy of determining the point of origin, as a higher portion of the refracted light can be evaluated.

According to a further embodiment, the window further comprises a layer of dimmable electrochromic glass.

According to a further embodiment of the method, the layer of dimmable electrochromic glass is dimmed upon impact of the laser beam on the window.

This provides the advantage that the effect of the laser beam upon persons behind the window can be negated.

According to a further embodiment of the window, the layer of dimmable electrochromic glass comprises a plurality of individually dimmable subsegments.

According to a further embodiment of the method, only the individually dimmable subsegment of the layer of dimmable electrochromic glass in which the laser beam impacts the window is dimmed.

This provides the advantage that visibility through the window is not impaired while negating the effect of the laser beam.

According to a further embodiment of the method, at least one of altitude, roll, pitch, or yaw of the aircraft is used to determine the point of origin of the laser beam. Thus, in particular, in addition to known altitude, the parameters roll, yaw and pitch may be used in combination to determine the point of origin of the laser beam. This can further increase the accuracy when determining the point of origin of the laser beam.

According to a further embodiment of the method, the point of origin of the laser beam is determined utilizing data collected at at least two different points in time. This additional information, in particular as it concerns the position of the vehicle, advantageously increases the accuracy of determining the point of origin of the laser.

The above embodiments and further developments can be combined with each other as desired, if useful. Further possible embodiments, further developments and implementations of the disclosure herein also comprise combinations of features of the disclosure herein described above or below with respect to the embodiments which are not explicitly mentioned. In particular, the person skilled in the art will also add individual aspects as improvements or additions to the respective basic form of the disclosure herein.

BRIEF DESCRIPTION OF THE DRAWINGS

The disclosure herein is explained in more detail below with reference to the embodiments shown in the schematic figures.

DETAILED DESCRIPTION

The accompanying figures are intended to provide a further understanding of embodiments of the disclosure herein. They illustrate embodiments and, in connection with the description, serve to explain principles and concepts of the disclosure herein. Other embodiments and many of the advantages mentioned will be apparent with reference to the drawings. The elements of the drawings are not necessarily shown to scale with respect to each other.

In the figures of the drawings, identical elements, features and components that have the same function and the same effect are each given the same reference signs, unless otherwise specified.

Figure 1:
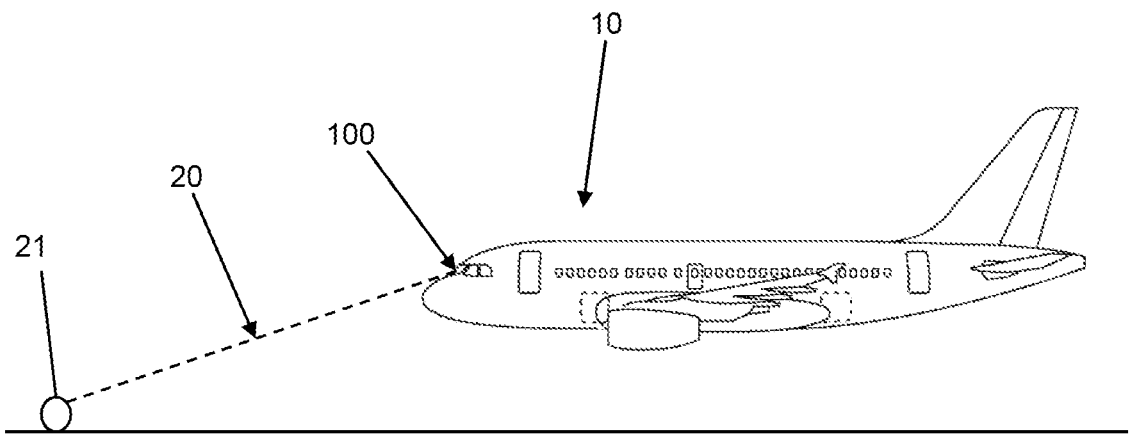
FIG. 1 shows a schematic illustration of an aircraft according to an embodiment of the disclosure herein.

FIG. 1 shows a schematic illustration of an aircraft 10 according to an embodiment of the disclosure herein.

The aircraft 10 is flying at a specific altitude above the ground. A laser beam 20 is emitted from a point of origin 21 on the ground and impacts the aircraft 10 at the location of a window 100, in this specific case a windshield of the cockpit.

The situation shown in FIG. 1 is an example of a situation in which it would be preferable to be able to determine the point of origin 21 of the laser beam 20. Various ways how this can be accomplished according to the disclosure herein will be explained in further detail with reference to the following figures.

Figure 2A:
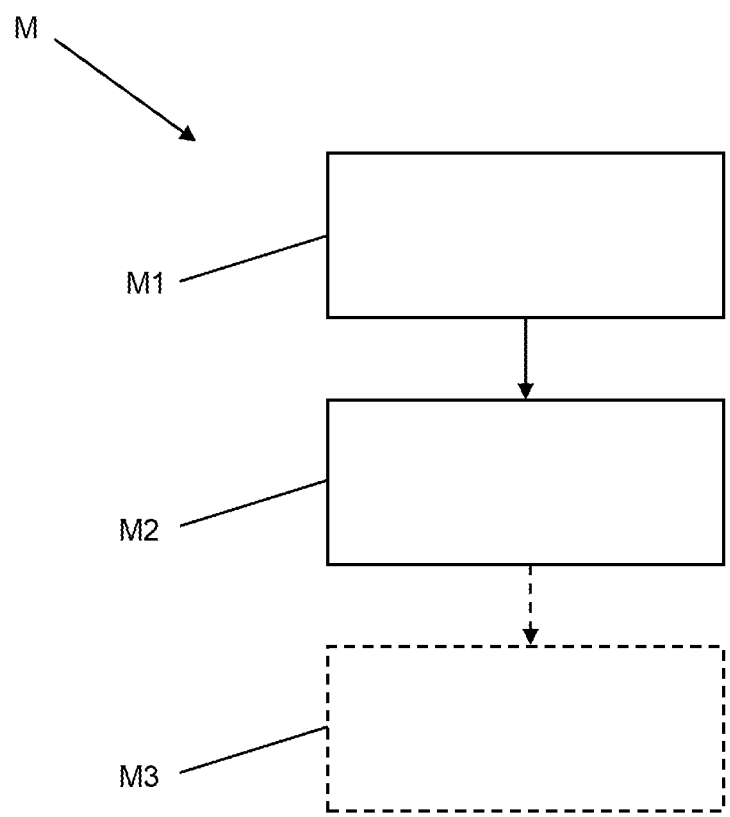
FIGS. 2a and 2b show schematic flow charts for methods to determine the point of origin of a laser beam according to embodiments of the disclosure herein.

FIG. 2a shows a schematic flow chart for a method M to determine the point of origin of a laser beam according to an embodiment of the disclosure herein.

In a first method step M1, an intensity of light refracted upon entering and exiting a first transparent layer of the window is measured by a first plurality of light detectors. In a second method step M2, a position at which the laser beam entered the first transparent layer is determined using the intensity of refracted light measured by each of the first plurality of light detectors. In a third optional method step M3, indicated by dashed lines, the point of origin of the laser beam is determined utilizing the position at which the laser beam entered the first transparent layer.

Figure 2B:
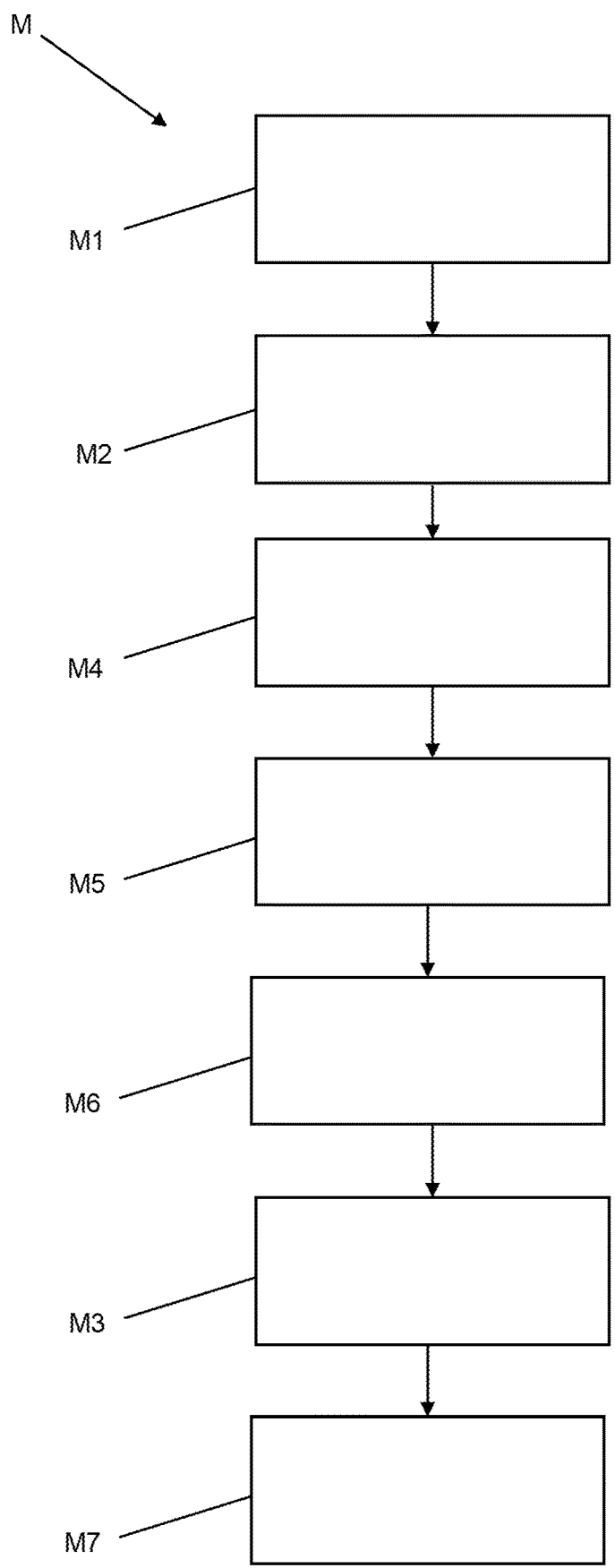

FIG. 2b shows schematic flow chart for a method M to determine the point of origin of a laser beam according to another embodiment of the disclosure herein.

The method M shown in FIG. 2b comprises the method steps shown in FIG. 2a. Furthermore, between method steps M2 and M3, an intensity of light refracted upon entering and exiting a second transparent layer is measured by a second plurality of light detectors in a method step M4, a position at which the laser beam entered the second transparent layer is determined using the intensity of refracted light measured by each of the second plurality of light detectors in a method step M5, and an angle at which the laser beam impacted the window is determined utilizing the position at which the laser beam entered the first transparent layer and the position at which the laser beam entered the second transparent layer in a method step M6. In a further method step M7, a layer of dimmable electrochromic glass is dimmed upon impact of the laser beam on the window.

In general, the laser beam in question will impact the window for an extended period of time. Consequently, the various method steps shown in FIGS. 2a and 2b can also be performed repeatedly over the extended period of time. In particular, the position and the angle of impact of the laser beam can be determined at various points in time, at which the aircraft will be located at different positions. With this additional data, the point of origin of the laser beam can be determined with increased accuracy.

How the method steps of the methods shown in FIGS. 2a and 2b are carried out according to the disclosure herein will be further explained with reference to the following figures.

Figure 3A:
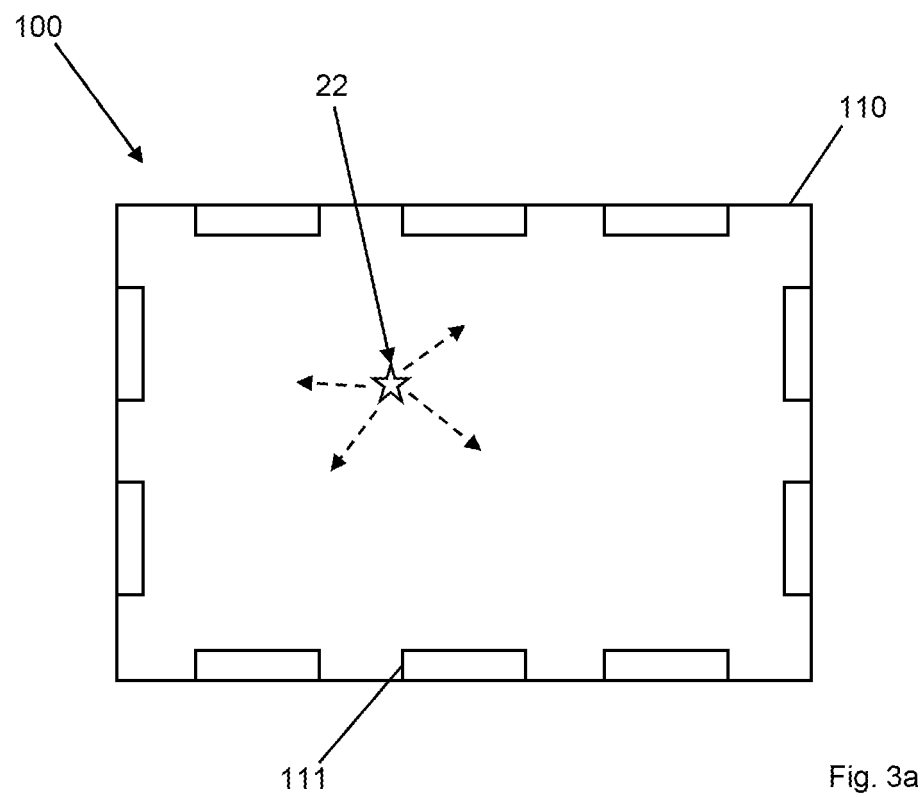
FIGS. 3a and 3b show schematic illustrations of a window for an aircraft according to an embodiment of the disclosure herein.
Figure 3B:
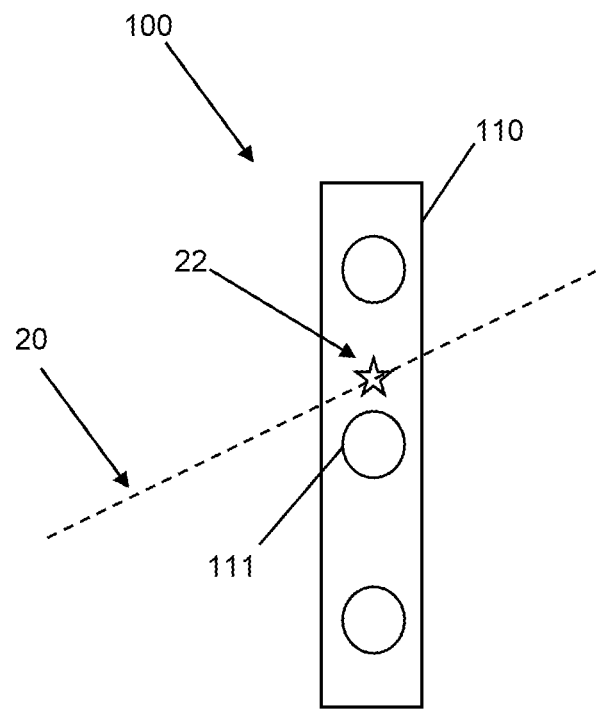

FIG. 3a shows a schematic illustration of a window 100 for an aircraft according to an embodiment of the disclosure herein in a front view. FIG. 3b shows a schematic illustration of a window 100 for an aircraft according to an embodiment of the disclosure herein in a side view.

The window 100 comprises a first transparent layer 110 and a first plurality of light detectors 111 arranged around a circumference of the first transparent layer 110. The first plurality of light detectors 111 are configured to measure the intensity of light refracted upon entering and exiting the first transparent layer 110.

A laser beam 20 enters the first transparent layer 110 at a position 22. Upon entering the first transparent layer 110, some portion of the light of the laser beam 20 will be refracted in all directions due to a difference in refraction index between the first transparent layer 110 and the ambient medium, which might be air or another transparent layer of the window 100. Some of the refracted light will be received by each of the first plurality of light detectors 111, which will then measure the intensity of light refracted in its respective direction. The intensity measured by each light detector 111 will depend in great parts on the distance the refracted light has traveled through the first transparent layer. The values for the intensities measured by each of the first plurality of light detectors 111 can therefore be used to determine the position 22 at which the laser beam 20 has entered the first transparent layer 110.

Figure 4:
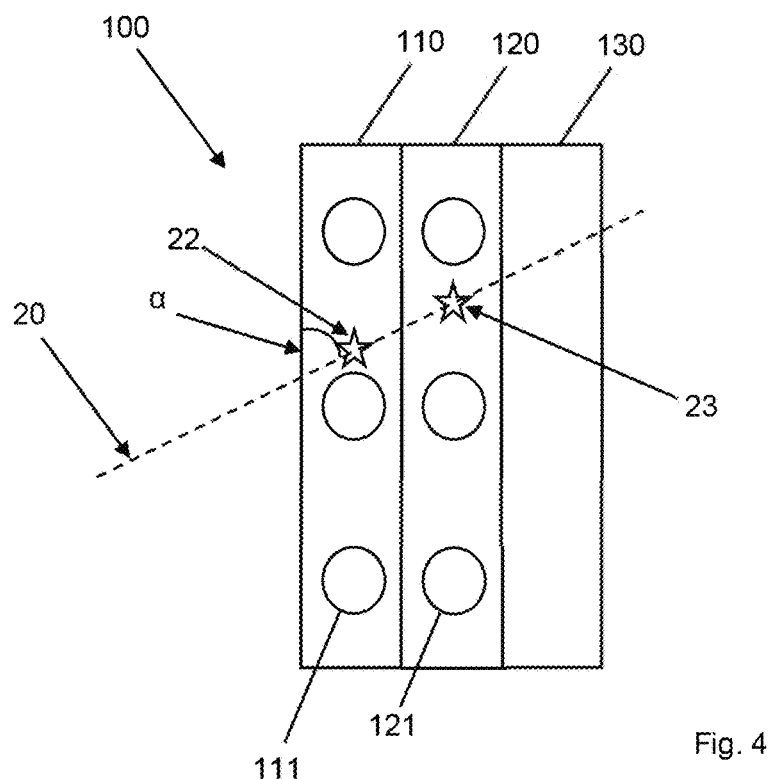
FIG. 4 shows a schematic illustration of a window for an aircraft according to an embodiment of the disclosure herein.

FIG. 4 shows a schematic illustration of a window 100 for an aircraft according to a further embodiment of the disclosure herein.

The window 100 comprises a first transparent layer 110, a second transparent layer 120, a layer of dimmable electrochromic glass 130, a first plurality of light detectors 111 arranged around a circumference of the first transparent layer 110, and a second plurality of light detectors 121 arranged around a circumference of the second transparent layer 120. The first plurality of light detectors 111 are configured to measure the intensity of light refracted upon entering and exiting the first transparent layer 110. The second plurality of light detectors 121 are configured to measure the intensity of light refracted upon entering and exiting the second transparent layer 120.

A position 22 at which a laser beam 20 enters the first transparent layer 110 is determined as has been described with respect to FIGS. 3a and 3b. A position 23, at which the laser beam 20 enters the second transparent layer 120 can be determined in an analogous way, only using the intensities of light measured by the second plurality of light detectors 121 instead of the those measured by the first plurality of light detectors 111. The positions 22 and 23 relative to each other can be determined as the thicknesses of the first transparent layer 110 and the second transparent layer 120 are known. Knowing the positions 22 and 23 at which the laser beam 20 enters the first transparent layer 110 and the second transparent layer 120 respectively, an angle $\alpha$ at which the laser beam 20 impacts the window 100 can be determined using basic trigonometric calculations. Looking at FIG. 1, the point of origin 21 of the laser beam 20 can now be determined using the angle $\alpha$ and the altitude of aircraft 10. To improve the results of this determination, it can be beneficial to take the roll, pitch, and/or yaw of the aircraft 10 into account.

The window 100 shown in FIG. 4 further comprises a layer of dimmable electrochromic glass 130. The function of this layer of dimmable electrochromic glass 130 will be described in more detail with reference to FIG. 5.

The disclosure herein is not limited to the configuration of layers shown in FIG. 4. In particular, the first transparent layer 110 and second transparent layer 120 do not have to be adjacent to each other and the layer of dimmable electrochromic glass 130 is not necessarily directly adjacent to the second transparent layer 120.

Figure 5:
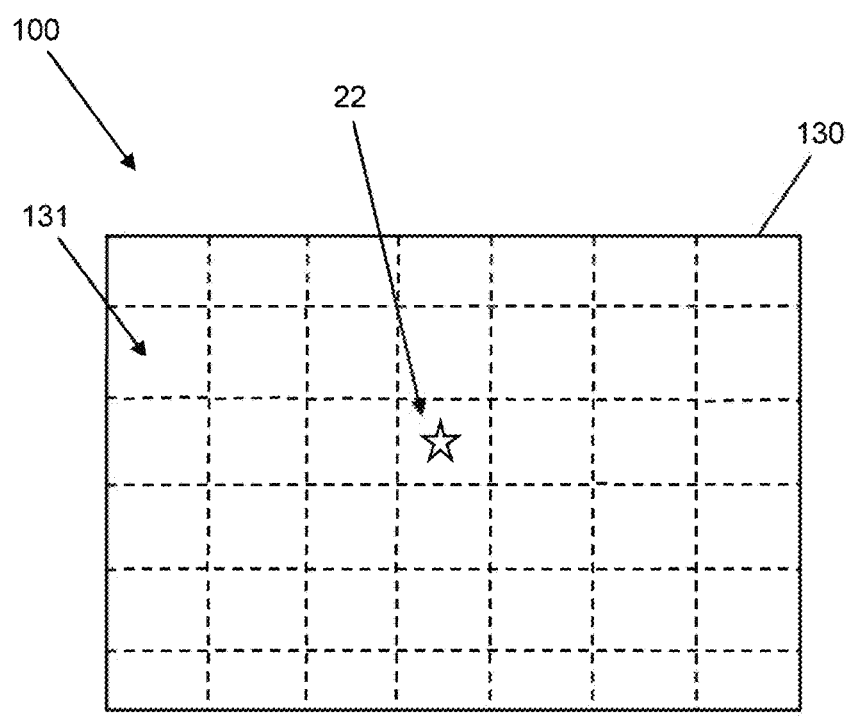
FIG. 5 shows a schematic illustration of a window for an aircraft according to an embodiment of the disclosure herein.

FIG. 5 shows a schematic illustration of a window 100 for an aircraft according to a further embodiment of the disclosure herein.

The window 100 comprises a layer of dimmable electrochromic glass 130, which comprises a plurality of individually dimmable subsegments 131.

When a laser beam impacts the window 100 at a position 22, the layer of dimmable electrochromic glass 130 can be dimmed in response, negating the effect of the laser beam on persons behind the window 100.

Using electrodes arranged in a grid-like manner, the layer of dimmable electrochromic glass 130 can be divided into a plurality of individually dimmable subsegments 131. As the position 22 of the laser beam can be determined as described with respect to the preceding figures, it is possible to only dim the individually dimmable subsegment 131 in which the position 22 is located, thereby negating the effect of the laser beam without compromising the visibility through the window 100 as a whole.

Throughout the present application, reference has been made to "determining the position at which a laser beam enters a layer". This is to be understood as a simplified formulation used to increase the legibility of the present application. In real applications, light can be refracted upon entering and/or exiting a layer, depending on the differences in refraction index between the respective layer and adjacent mediums. Consequently, the formulation "determining the position at which a laser beam enters a layer" can also encompass the case where a position at which a laser beam exits a layer is determined in the context of the disclosure herein. In case that light is significantly refracted upon both entering and exiting a layer, "determining the position at which a laser beam enters the layer" should be understood as encompassing "determining an average between the position at which a laser beam enters the layer and the position at which the laser beam exits the layer". Looking at the example shown in FIG. 4, if the two transparent layers 110 and 120 are made from the same material, little to no refraction should happen at the border between the two transparent layers 110 and 120. Significant refraction only happens at the positions where the laser beam 20 enters the first transparent layer 110 and exits the second transparent layer 120. In that case, with the methods described in the present application, a position where the laser beam enters the first transparent layer 110 and a position where the laser beam exits the second transparent layer 120 can be determined. These positions can then be utilized to determine the point of origin of the laser beam 20 as described.

Throughout the present application, reference has been made to "determining the point of origin" of a laser beam. Due to inaccuracies inherent in real situations, it can be situationally impossible to determine the point of origin with exact accuracy. A point of origin of a laser beam is considered to be "determined" in the context of the present application, if it can be determined with an accuracy of several hundred feet.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 10 aircraft
20 laser beam
21 point of origin
22 position
23 position
100 window
110 first transparent layer
111 light detector
120 second transparent layer
121 light detector
130 layer of dimmable electrochromic glass
131 subsegment
M method
M1 method step M2 method step
M3 method step
M4 method step
M5 method step
M6 method step
M7 method step

The invention claimed is:

1. A window for an aircraft, the window comprising:
a first transparent layer;
a first plurality of light detectors arranged around a circumference of the first transparent layer, coplanar with the first transparent layer, and configured to measure an intensity of light refracted upon entering and exiting the first transparent layer;
a second transparent layer; and
a second plurality of light detectors arranged around a circumference of the second transparent layer, coplanar with the second transparent layer, and configured to measure an intensity of light refracted upon entering and exiting the second transparent layer.

2. The window according to claim 1, wherein the first plurality of light detectors are arranged to cover an entirety of the circumference of the first transparent layer in regular intervals.

3. The window according to claim 2, wherein the second plurality of light detectors are arranged to cover an entirety of the circumference of the second transparent layer in regular intervals.

4. The window according to claim 1, comprising a layer of dimmable electrochromic glass.

5. The window according to claim 4, wherein the layer of dimmable electrochromic glass comprises a plurality of individually dimmable subsegments.

6. An aircraft comprising the window according to claim 1, wherein the window comprises a windshield of a cockpit.

7. The window according to claim 1, wherein the first plurality of light detectors are configured to determine an average between a position at which a laser beam enters the first transparent layer and a position at which the laser beam exits the first transparent layer.

8. The window according to claim 7, wherein the second plurality of light detectors are configured to determine an average between a position at which a laser beam enters the second transparent layer and a position at which the laser beam exits the second transparent layer.

9. The window according to claim 1, wherein the second plurality of light detectors are configured to determine an average between a position at which a laser beam enters the second transparent layer and a position at which the laser beam exits the second transparent layer.

10. The window according to claim 1, wherein the second plurality of light detectors are arranged to cover an entirety of the circumference of the second transparent layer in regular intervals.

11. A method for determining a position at which a laser beam impacts a window, the method comprising:
measuring an intensity of light refracted upon entering and exiting a first transparent layer of the window by a first plurality of light detectors arranged around a circumference of the first transparent layer, coplanar with the first transparent layer;
measuring an intensity of light refracted upon entering and exiting a second transparent layer of the window by a second plurality of light detectors arranged around a circumference of the second transparent layer, coplanar with the second transparent layer;
determining a position at which the laser beam entered the first transparent layer using the intensity of refracted light measured by each of the first plurality of light detectors; and
determining a point of origin of the laser beam.

12. The method according to claim 11, comprising wherein determining the point of origin of the laser beam uses the position at which the laser beam entered the first transparent layer.

13. The method according to claim 12, comprising:
determining a position at which the laser beam entered the second transparent layer using the intensity of refracted light measured by each of the second plurality of light detectors; and
determining an angle at which the laser beam impacted the window utilizing the position at which the laser beam entered the first transparent layer and the position at which the laser beam entered the second transparent layer;
wherein the angle at which the laser beam impacted the window is used to determine the point of origin of the laser beam.

14. The method according to claim 11, wherein the window is part of a windshield of a cockpit of an aircraft, the window comprising:
the first transparent layer; and
the first plurality of light detectors, which are arranged around the circumference of the first transparent layer and configured to measure the intensity of the light refracted upon entering and exiting the first transparent layer; and
wherein at least one of altitude, roll, pitch, or yaw of the aircraft is used to determine the point of origin of the laser beam.

15. The method according to claim 11, wherein the laser beam impacts the window, the window comprising:
the first transparent layer;
the first plurality of light detectors arranged around the circumference of the first transparent layer and configured to measure the intensity of the light refracted upon entering and exiting the first transparent layer; and
a layer of dimmable electrochromic glass;
the method comprising dimming the layer of dimmable electrochromic glass upon impact of the laser beam on the window.

16. The method according to claim 15, wherein:
the laser beam impacts the window; and
the layer of dimmable electrochromic glass comprises a plurality of individually dimmable subsegments; and
only individually dimmable subsegments of the plurality of individually dimmable subsegments that are impacted by the laser beam are dimmed.

17. The method according to claim 11, wherein the point of origin of the laser beam is determined utilizing data collected at least at two different points in time.

18. The method according to claim 11, wherein the first plurality of light detectors are configured to determine an average between a position at which a laser beam enters the first transparent layer and a position at which the laser beam exits the first transparent layer.

19. The method according to claim 18, wherein the second plurality of light detectors are configured to determine an average between a position at which a laser beam enters the second transparent layer and a position at which the laser beam exits the second transparent layer.

20. The method according to claim 11, wherein the second plurality of light detectors are configured to determine an average between a position at which a laser beam enters the second transparent layer and a position at which the laser beam exits the second transparent layer.

* * * * *